United States Patent Office 3,476,795
Patented Nov. 4, 1969

3,476,795
HYDROXYESTERS OF BARK PHENOLIC ACIDS
George Graham Allan, Seattle, Wash., assignor to Weyerhaeuser Company, Tacoma, Wash., a corporation of Washington
No Drawing. Continuation-in-part of application Ser. No. 399,881, Sept. 28, 1964. This application Oct. 22, 1965, Ser. No. 502,589
Int. Cl. C07c *69/76;* C08g *33/10*
U.S. Cl. 260—473.5
2 Claims

ABSTRACT OF THE DISCLOSURE

Disclosed herein are reaction products of the sodium salts of bark phenolic acids and an alkylene oxide such as ethylene oxide, propylene oxide, butylene oxide or mixtures thereof. The reaction products are useful as intermediates in the preparation of polyurethanes by further reaction with di- or polyisocyanates.

CROSS-REFERENCE TO RELATED APPLICATIONS

This application is a continuation-in-part of my copending application Ser. No. 399,881 filed Sept. 28, 1964, entitled "Esters of Bark Phenolic Acids."

This invention relates to a new use for hydroxyesters derived from bark phenolic acids. More specifically, this invention relates to polyurethanes form from bark phenolic acids.

In recent years, much time and effort have been expended on finding a use for wasteful by-products of the lumber industry such as the bark from trees. U.S. Patent No. 2,890,231 issued to Clark C. Heritage and Lionel E. Dowd described a process for extracting the chemical products from bark with an alkaline solvent. The resulting products from this process include an alkaline solution of bark phenolic acids. Analysis of these bark phenolic acids shows that they contain up to 15% by weight of carboxyl groups. As sodium salts, these bark phenolic acids are hydrophilic and are water soluble. They currently find usage in outlets such as dispersants for drilling mud compositions, cement additives, pesticide dispersants and the like.

In the above-noted copending patent application, these bark phenolic acids are transformed into organic solvent soluble products by esterification of the carboxylic acid groups by using an alcohol. The esters thus formed can be represented by the following reaction product and formula:

HOOC-bark phenolic acid-COOH+2ROH→
ROOC-bark phenolic acid-COOR+2HOH

In the above-noted formula, R may be any alkyl group or substituted alkyl group ranging from 1 to 18 carbon atoms.

Hydroxyl groups may be introduced into the bark phenolic acids by esterification using esterifiable polyols selected from the group consisting of ethyleneglycol, 1,3-butyleneglycol, 1,2,6-hexanetriol, polyethyleneoxydiols having molecular weights of 200, 300, 400, and 500, polypropyleneoxydiol having molecular weights of 400 and 1200 and polybutyleneoxydiol having a molecular weight of 500, diethyleneglycol, triethyleneglycol, propyleneglycol, and polyepichlorohydringlycol. The reaction between the bark phenolic acids and the alcohols is carried out in the presence of a catalyst selected from the group consisting of sulfuric acid, hydrochloric acid, phosphoric acid or mixtures thereof. The product obtained is a hydroxyester of bark phenolic acids.

It has been discovered that these hydroxyesters of bark phenolic acids are useful in the formulation of polyurethane foams and polyurethane resins. In the practice of the present invention, a hydroxyester is first prepared by reacting bark phenolic acids with a glycol or a polyalcohol as outlined above. The reaction product, a hydroxyester of bark phenolic acids, may be reacted with di- or polyisocyanates to obtain the polyurethanes which are useful as protective coatings and foams for insulation, packaging, and space filling material.

Alternatively, the hydroxyesters may be prepared by hydroxyalkylation by mixing the sodium salt of the bark phenolic acid with an alkylene oxide selected from the group consisting of ethylene oxide, propylene oxide, butylene oxide, or mixtures thereof. The amount of alkylene oxide used to react with the sodium salt of the bark phenolic acids will vary in accordance with the final viscosity and hydroxyl number of the hydroxyester desired. When the sodium salt of the bark phenolic acid is mixed with the alkylene oxide, an exothermic reaction occurs. After the reaction product has been cooled, the product is diluted with methanol and treated with a 50% solution of sulfuric acid to bring the pH to about 7. After all the water is removed, the product in methanol is separated by filtration or centrifugation. The final product is a hydroxyester of bark phenolic acids and can be used as pointed out above in the formulation of polyurethanes by adding or reacting di- or polyisocyanate therewith.

In order to further illustrate the merits of the present invention, the following examples are given.

EXAMPLE I

A hydroxyester was prepared by reacting 400 parts of bark phenolic acids with 612 parts of polypropyleneglycol having a molecular weight of 400 in the presence of 184 parts of sulfuric acid and 1500 parts acetone. After stirring continuously at room temperature for eight hours, the excess sulfuric acid catalyst was neutralized with sodium bicarbonate. The acetone solution of the hydroxyester of bark phenolic acid is concentrated by heating and the acetone removed and recovered for reuse. The product (820 parts) was a solution of the hydroxyester of bark phenolic acid in excess of the esterifying polypropyleneglycol. Saponification showed that the hydroxyester container about 46.7% of combined alcohol. The hydroxyl number of the total product was 283. The hydroxyester was then used to prepare a polyurethane foam by reacting 127 parts of the hydroxyester of bark phenolic acids with 140 parts of p,p'-diphenylmethane diisocyanate and 5 parts polytetramethylenediol diisocyanate in the presence of 80 parts of trichlorofluoromethane, 0.25 part of 1,2,4-trimethylpiperazine, 1 part dibutyltin dilaurate, 1 part silicone surfactant and 10 parts of sucrose-based polyether. The product is a polyurethane foam having the following properties: density, 2.1 lbs./ft.$^3$; compressive strength, 9 p.s.i.; modulus of compressive elasticity (to 25% deformation), 107; tensile strength, 31 p.s.i.; block shear, 25 p.s.i.

EXAMPLE II

Hydroxyesters of bark phenolic acids were prepared by hydroxypropylation of bark phenolic acids by reacting a mixture of 107.5 parts of the sodium salt of bark phenolic acids and 300 parts propylene oxide. This mixture was heated with stirring in an autoclave. At 150° C. an exothermic reaction occurred and the pressure rose to 110 p.s.i. in two min. The reaction was cooled by circulating water through a cooling coil and the autoclave opened. The unreacted propylene oxide amounted to 2 parts, and the product was diluted with 500 parts of methanol and treated with a 50% solution of sulfuric acid until the pH was 7. After the addition of 20 parts of anhydrous sodium sulfate to remove any water, the product in methanol was separated by centrifugation. Evaporation of the methanol provided the hydroxypropylated bark product, a fluid black oil having a hydroxyl number of 409. Then 13.7 parts of the hydroxyesters of bark phenolic acids was reacted with 12 parts of p,p'-diphenylmethane diisocyanate in the presence of 5 parts of trichlorofluoromethane, 0.1 part of dibutyltin dilaurate, 0.025 part of 1,2,4-trimethylpiperazine, and 0.1 part of a surface active agent. The product was a rigid foam having the following properties: density, 2 lbs./ft.$^3$; compressive strength, 8.8 p.s.i.; modulus of compressive elasticity, 229; tensile strength, 40 p.s.i.

While specific details of a preferred procedure embodying the above invention have been described above, it will be apparent that many changes and modifications may be made without departing from the spirit of the invention. It should, therefore, be understood that the examples cited are intended to be illustrative only and are not intended to limit the scope of the invention.

What is claimed is:
1. The reaction product formed by the exothermic reaction of the sodium salt of bark phenolic acid and an alkylene oxide selected from the group consisting of ethylene oxide, propylene oxide, butylene oxide and mixtures thereof.
2. The reaction product of claim 1 wherein the alkylene oxide is propylene oxide.

References Cited
UNITED STATES PATENTS

| | | | |
|---|---|---|---|
| 2,845,450 | 7/1958 | Anderson et al. | 260—473.5 |
| 2,890,231 | 6/1959 | Heritage et al. | 260—412.5 |

LORRAINE A. WEINBERGER, Primary Examiner

D. STENZEL, Assistant Examiner

U.S. Cl. X.R.
260—47, 473.6